United States Patent [19]

Seiler, Jr.

[11] Patent Number: 4,494,563
[45] Date of Patent: Jan. 22, 1985

[54] FLUID SAFETY VALVE

[75] Inventor: James F. N. Seiler, Jr., Frederick, Md.

[73] Assignee: The United States of America as represented by the Secretary of the Army, Washington, D.C.

[21] Appl. No.: 441,311

[22] Filed: Nov. 12, 1982

[51] Int. Cl.³ .................. F16K 31/36; F16K 17/00
[52] U.S. Cl. .......................... 137/496; 137/505.38; 137/513.3
[58] Field of Search ............. 137/510, 505.38, 110, 137/496, 513.3; 251/61.6

[56] References Cited

U.S. PATENT DOCUMENTS 2,960,109  11/1960  Wilson .................. 137/513.3 X
3,083,943   4/1963  Stewart et al. ............ 251/61.1
3,390,696   7/1968  Dawson ..................... 137/496

Primary Examiner—Martin P. Schwadron
Assistant Examiner—Stephen M. Hepperle
Attorney, Agent, or Firm—John H. Raubitschek; Arthur I. Spechler; Werten F. W. Bellamy

[57] ABSTRACT

A typical embodiment of the invention provides a means for protecting delicate instruments from damage. A flexible membrane separates two chambers in which, during ordinary operation, the fluid pressures are the same. One of the two chambers also serves as a fluid conduit in the system. Pressure loss in the system causes the higher pressure chamber to flex the membrane which closes a port in the fluid conduit chamber, thereby preventing further system pressure loss and consequent equipment damage. The membrane, moreover, can have a small bleed to permit gradual, dampened fluid pressure release.

1 Claim, 1 Drawing Figure

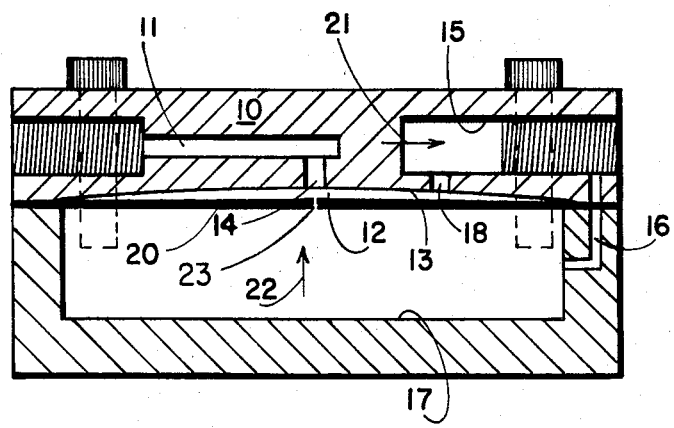

FLUID SAFETY VALVE

The invention described herein may be manufactured, used and licensed by or for the Government for governmental purposes without payment of any royalty thereon.

BACKGROUND OF THE INVENTION

1. Field of Invention

This invention relates to safety valves and, more specifically, to a safety valve having a flexible membrane that responds to sudden losses of pressure by throttling further flow from the system.

2. Description of the Prior Art

Protecting equipment from damage caused by sudden fluid pressure loss is a problem upon which a great deal of technical effort and ingenuity have been lavished. Delicate gauges, measuring instruments, and the like, are frequently exposed to relatively high fluid pressures. A sudden drop in these pressures because of a ruptured hydraulic or pneumatic line, for example, is likely to damage devices of this nature by compelling the mechanisms to respond to the pressure change at much greater than design speeds and thus to slam against the mechanism limits, or stops.

Swing-check and ball-check valves have been developed for this protective purpose. In general, these valves react to a change in the direction of hydraulic or gas flow within the system by obstructing this reverse flow. These valves are, however, subject to wear and the speed with which they respond may in itself physically shock the mechanisms that they are designed to protect.

Consequently, there is a need for a fluid safety valve that is sufficiently well dampened in its action to insure that it does not damage the very apparatus it is designed to protect. There also is a further need for a safety valve in which component wear is reduced to a minimum.

SUMMARY OF THE INVENTION

These and other problems that have beset the prior art are overcome, to a great extent, through the practice of the invention. Illustratively, a safety valve according to the principles of the invention comprises two chambers that are separated from each other by means of a flexible membrane. One of these chambers also serves as a conduit in the fluid system that is to be protected.

During normal operation, the fluid pressure in both chambers is equal and the flexible membrane is stationary. Upon pressure loss in the system, the pressure in the chamber that also serves as a conduit decreases, too. The higher pressure in the other chamber presses the membrane into the lower pressure chamber sufficiently far to enable the membrane to obstruct the fluid inlet from the system to the now lower pressure chamber. In this way, the membrane prevents further pressure loss from the system through a swift but gentle closing of the inlet to the chamber that otherwise serves as a fluid conduit.

Preferably, superior dampened action with the apparatus that characterizes the invention can be provided if a small aperture is formed in the membrane to permit fluid communication between the higher pressure chamber and the hitherto obstructed inlet in the other chamber. In this manner, the higher pressure fluid slowly bleeds into the low pressure portion of the system, gradually relieving the higher pressure and thereby permitting delicate instruments, and the like, to restore gently to a lower pressure status and avoid the shock, stress and wear that an abrupt change in pressure would engender.

Thus, it is an object of the invention to provide an improved safety valve that ameliorates the impact of abrupt pressure losses on fluid system equipment.

It is a further object of the invention to provide a safety valve that avoids mechanical part wear.

It is still a further object of the invention to provide a safety valve in which the effect of sudden fluid pressure losses are dampened.

BRIEF DESCRIPTION OF THE DRAWING

The sole FIGURE of the drawing is a front elevation, in full section, of a typical embodiment of the invention.

DESCRIPTION OF THE PREFERRED EMBODIMENT

For a more complete appreciation of the invention, attention is invited to the drawing which shows a member 10 in which a fluid inlet 11 is formed to establish communication between a measuring system, or the like (not shown), and a conduit chamber 12.

The chamber 12, in the illustrative embodiment, is formed by developing a shallow, conically concave, or dished surface 13 in the member 10. It has been found, for example, that an apex angle of 176° provides a chamber profile that achieves suitable results. A port 14 that is perpendicular to the fluid inlet and is coincident with the apex of the surface 13 provides fluid communication between the inlet 11 and the chamber 12.

A discharge port 18 communicates with the chamber 12 and an expansion conduit 15. Thus, as shown in the drawing, the discharge port 18 is formed in the member 10 near the periphery of the dished surface 13, that is, in the skirt or border portion of the conical surface. The expansion conduit 15, moreover, enjoys a substantially larger volume than the counterpart fluid inlet 11, in accordance with the physical characteristics of the system of which the safety valve is a part.

In accordance with a feature of the invention, a fluid bypass conduit 16 establishes communication between the expansion conduit 15 and a rather voluminous primary chamber 17 that is formed in the member 10. As illustrated in the drawing, the chamber 17 matches the corresponding configuration of the conduit chamber 12 with which it is aligned and adjoins.

A flexible membrane 20 of rubber, neoprene, or other suitable material forms a partition that separates the conduit chamber 12 from the primary chamber 17 at the common face that these two chambers share.

In operation, a fluid, of which air is typical, flows through the system in the direction of arrow 21. Thus, air enters the fluid inlet 11 and flows through a path that includes the port 14, the conduit chamber 12, the discharge port 18 and the expansion conduit 15. A salient aspect of the invention, however, resides in the bypass conduit 16 which serves to equalize the pressure in the primary chamber 17 with the pressure in the conduit chamber 12. In these circumstances, with the pressure in the chambers 12,17 equalized, the membrane 20 is stretched across the surface that is common to these two chambers.

Should the air pressure in the fluid inlet 11 undergo an abrupt decrease as a consequence, for example, of a rupture in the air-tight integrity of the system, the air pressure in the conduit chamber 12 also experiences a corresponding decrease. The air pressure in the primary chamber 17, however, remains essentially at the higher level that existed prior to the rupture because the loss of air pressure has not yet had an opportunity to propogate throughout the entire system.

The flexible membrane 20, under the influence of the higher pressure in the primary chamber 17, shifts and stretches in the direction of arrow 22 in order to press against the conical surface 13 of the conduit chamber 12 and seal the port 14. The membrane 20 should be sufficiently flexible to seal the port 14 before the pressure in the primary chamber 17 decreases to a level at which an adequate seal can not be established.

To restore the chamber 12 to a functional conduit status, it is only necessary to seal the rupture and repressurize the system. The sufficient higher pressure thus established in the fluid inlet 11 and the port 14 relative to the pressure in the chamber 17 presses the membrane 20 away from the port. The membrane 20 is thus progressively pressed back until fluid communication is reestablished with the discharge port 18 and the expansion conduit 15. In this circumstance, the chamber 12 once more serves as a conduit in the system, fluid pressure is equalized in the chambers 12,17 and the membrane 20 is restored to an unstressed status.

It has been found that forming a small aperture 23 in the membrane 20 in alignment with the port 14 enhances the dampened response feature of the invention. The aperture formed, for example, by piercing the membrane 20 with a No. 20 hypodermic needle is suitable for the purposes of the invention.

In operation, after pressure is lost in the conduit chamber 12, the relatively higher pressure in the primary chamber 17 presses the membrane against the conical surface 13 to close the port 14 as mentioned above. The pressure in the expansion conduit 15, the bypass conduit 16, and the primary chamber 17 (as well as the balance of the system that is not shown in the drawing and in which the action of the membrane 20 temporarily prevented further pressure loss) gradually declines to match the pressure in the inlet 11 as air bleeds into the port 14 through the aperture 23. In this manner, the delicate mechanisms that ordinarily are coupled to fluid systems are gently brought down to the lower pressure level in a manner that avoids the excessive wear and structural shock that otherwise might occur in unprotected systems, or in those systems that are protected through the ball-and-swing check valves that have characterized the prior art.

I claim:

1. A safety valve for protecting apparatus from abrupt fluid pressure loss in a fluid system by damping the effects of the pressure loss comprising:

a member having a conduit chamber formed therein and a primary chamber formed therein, said conduit chamber having a shallow conically concave shape, said primary chamber being aligned with and having a configuration that essentially matches the corresponding configuration of said conduit chamber, said member having a fluid inlet formed therein and a port also formed therein, said port being coincident with the apex of said conical conduit chamber in order to establish fluid communication between said fluid inlet and said conduit chamber, said member also having an expansion conduit and a discharge port formed therein, said discharge port establishing fluid communication between said expansion conduit and said conduit chamber at the periphery of said conduit chamber and said expansion conduit having a substantially larger volume than said fluid inlet, said member having a bypass conduit formed therein, said bypass conduit establishing fluid communication between said expansion conduit and primary chamber, and a flexible membrane separating said conduit chamber from said primary chamber in order to respond to relatively higher fluid pressure in said primary chamber by closing said port at said conduit chamber apex, thereby to terminate temporarily fluid pressure loss in at least a portion of the fluid system, said flexible membrane having an aperture formed therein in alignment with said port at said conduit chamber apex to enable the fluid pressure in said primary chamber, said bypass conduit and said expansion conduit to gradually become equal with said fluid inlet fluid pressure and thus to protect the apparatus from abrupt fluid pressure loss.

* * * * *